US009894472B2

(12) United States Patent
Larsen et al.

(10) Patent No.: US 9,894,472 B2
(45) Date of Patent: Feb. 13, 2018

(54) APPARATUS AND METHOD FOR RECEIVING AN AUDIO SIGNAL

(71) Applicant: GN Audio A/S, Ballerup (DK)

(72) Inventors: Leo Larsen, Ballerup (DK); Rene Elbaek Jensen, Ballerup (DK)

(73) Assignee: GN AUDIO A/S (DK)

( * ) Notice: Subject to any disclaimer, the term of this patent is extended or adjusted under 35 U.S.C. 154(b) by 0 days.

(21) Appl. No.: 15/244,470

(22) Filed: Aug. 23, 2016

(65) Prior Publication Data

US 2017/0064594 A1 Mar. 2, 2017

(30) Foreign Application Priority Data

Aug. 24, 2015 (EP) ..................................... 15182224

(51) Int. Cl.
*H04W 88/06* (2009.01)
*H04W 8/00* (2009.01)
*H04W 76/04* (2009.01)
*H04W 4/00* (2009.01)
*H04W 36/30* (2009.01)
(Continued)

(52) U.S. Cl.
CPC ............. *H04W 4/008* (2013.01); *H04B 10/11* (2013.01); *H04W 8/005* (2013.01); *H04W 36/30* (2013.01); *H04W 76/04* (2013.01); *H04W 88/06* (2013.01); *H04W 88/10* (2013.01)

(58) Field of Classification Search
CPC .. H02J 7/025; H02J 50/80; H02J 50/90; H02J 5/005; H02J 50/10; H02J 50/40; H02J 17/00; H02J 7/04; H04B 5/0037; H04B 5/00; H04B 7/26; H04B 10/11; H04W 8/005; H04W 36/30; H04W 76/04; H04W 88/06
See application file for complete search history.

(56) References Cited

U.S. PATENT DOCUMENTS

| 2011/0106954 A1* | 5/2011 | Chatterjee | G06F 1/1632 709/227 |
| 2014/0245464 A1* | 8/2014 | Chu | G07F 15/10 726/35 |
| 2014/0295758 A1 | 10/2014 | Pedersen | |

FOREIGN PATENT DOCUMENTS

| EP | 2100470 | 9/2009 | |
| EP | 2100470 B1 * | 9/2010 | ............ H04W 88/10 |

(Continued)

OTHER PUBLICATIONS

European Search Report for EP application No. 15182224 dated Feb. 5, 2016.

*Primary Examiner* — George Eng
*Assistant Examiner* — Jing Gao
(74) *Attorney, Agent, or Firm* — Altera Law Group, LLC (57) ABSTRACT

A mobile device (200) for receiving an audio signal from a source (390) via a base station (300) is disclosed. The mobile device comprises a first wireless communication interface (220) operable to communicate using a first mode of wireless communication; a second wireless communication interface (230)_operable to communicate using a second mode of wireless communication, the second mode having a shorter range than the first mode; and a controller (210) configured to switch from receiving the audio signal from the base station via the first wireless communication interface to receiving the audio signal via the second wireless communication interface when the mobile device is proximate to the base station.

16 Claims, 4 Drawing Sheets

(51) Int. Cl.
*H04W 88/10* (2009.01)
*H04B 10/11* (2013.01)

(56) References Cited

FOREIGN PATENT DOCUMENTS

EP         2541882         1/2013
WO    WO 2014071140 A2 *  5/2014  ............ H04W 48/20

* cited by examiner

APPARATUS AND METHOD FOR RECEIVING AN AUDIO SIGNAL

FIELD

This disclosure relates to a mobile device for receiving an audio signal from a source using multiple wireless communication interfaces, and in particular, but without limitation, to switching between wireless communication interfaces according to the proximity of the mobile device to the base station.

BACKGROUND

The use of wireless headsets in office and call centre environments is extremely popular. However, the infrastructure that supports the use of wireless headsets in such environments is facing an increasing number of challenges due to the continually increasing density of such headsets in a given space.

The preferred technologies used for wireless headsets are Digital Enhanced Cordless Telecommunications, DECT, and Bluetooth. However, both systems have limited bandwidth, which means that only a limited number of headsets can be used simultaneously within a given area. For example, DECT can only provide up to 120 channels for simultaneous communications to be taking place. In the modern call centre environment this is an insufficient number of channels.

One way to deal with this issue is to provide sufficient geographical separation to enable channel reuse, or by using different systems such as DECT and Bluetooth in parallel. However, spacing call centre workers out sufficiently to enable reuse of channels can be costly in terms of floor space and use multiple systems is far from ideal in terms of system maintenance.

In recent years, the use of wide band speech has increased which further reduces the number of available bands for DECT communications putting yet further stress on such infrastructure.

Current wireless office communications systems are therefore inadequate for the modern office and call centre environments.

SUMMARY

According to an aspect of the invention a mobile device is provided for receiving an audio signal from a source via a base station. The mobile device comprises a first wireless communication interface operable to communicate using a first mode of wireless communication, a second wireless communication interface operable to communicate using a second mode of wireless communication, the second mode having a shorter range than the first mode, and a controller configured to switch from receiving the audio signal from the base station via the first wireless communication interface to receiving the audio signal via the second wireless communication interface when the mobile device is proximate to the base station.

The mobile device may further comprise an energy store. The energy store may be operable to be charged via electromagnetic energy transfer. The energy store may be operable to be charged via electromagnetic energy transfer from the base station. The mobile device may be configured to charge the energy store when the mobile device is proximate to the base station.

The controller may be configured to switch from receiving the audio signal from the base station via the second wireless communication interface to receiving the audio signal via the first wireless communication interface when the mobile device is not proximate to the base station. The controller may be further configured to determine a parameter indicative of a proximity of the mobile device to the base station. The switching may be based on the parameter. The parameter may be the presence of a signal of the second mode of wireless communication at the second wireless communication interface above a threshold level. The parameter may be the presence of electromagnetic energy above a threshold level.

The mobile device may further comprise a wired communication interface. The controller may be further configured to transmit the audio signal to a headset via the wired communication interface.

The controller may be further configured to establish an association between the mobile device and the base station via the second wireless communication interface.

According to another aspect of the invention a base station for transmitting an audio signal to a mobile device is disclosed. The base station comprises a first wireless communication interface operable to communicate using a first mode of wireless communication, a second wireless communication interface operable to communicate using a second mode of wireless communication, the second mode having a shorter range than the first mode, and a controller configured to switch from transmitting the audio signal to the mobile device via the first wireless communication interface to transmitting the audio signal to the mobile device via the second wireless communication interface when the mobile device is proximate to the base station.

The base station may further comprise a charger operable to charge an energy store of the mobile device. The charger may charge the energy store via electromagnetic energy transfer.

The first wireless communication interface may be a radiofrequency communication interface. The second wireless communication interface may be an optical communication interface. The second wireless communication interface may be an infrared interface.

The second wireless communication interface may be an inductive communication interface.

According to yet another aspect of the invention a method of operating the mobile device as described herein or operating the base station as described herein is provided.

According to a further aspect of the invention a computer-readable medium carrying computer-readable instructions arranged, upon execution by a processor, to cause the processor to carry out any method disclosed herein is disclosed.

Also disclosed is a method for transmitting an audio signal from a base station to a mobile device. The base station comprises: a first wireless communication interface operable to communicate using a first mode of wireless communication; and a second wireless communication interface operable to communicate using a second mode of wireless communication, the second mode having a shorter range than the first mode; and the method comprising switching from transmitting the audio signal to the mobile device via the first wireless communication interface to transmitting the audio signal to the mobile device via the second wireless communication interface when the mobile device is proximate to the base station. The base station may further comprise a charger operable to charge an energy store of the mobile device via electromagnetic energy transfer.

A receiver suitable for receiving an audio signal from a source via a base station is also disclosed. The receiver comprising: a first wireless communication interface operable to communicate using a first mode of wireless communication; a second wireless communication interface operable to communicate using a second mode of wireless communication, the second mode having a shorter range than the first mode; an energy store operable to be charged via electromagnetic energy transfer; and a controller configured to: receive the audio signal from the base station via at least one of the first wireless communication interface and the second wireless communication interface; stop receiving the audio signal from the base station via the first wireless communication interface when the receiver is proximate to the base station.

Also disclosed is a base station suitable for transmitting an audio signal to a receiver, the receiver comprising: a first wireless communication interface operable to communicate using a first mode of wireless communication; a second wireless communication interface operable to communicate using a second mode of wireless communication, the second mode having a shorter range than the first mode; a charger operable to charge the receiver via electromagnetic energy transfer; and a controller configured to: transmit the audio signal to the receiver via at least one of the first wireless communication interface and the second wireless communication interface; stop transmitting the audio signal to the receiver via the first wireless communication interface when the receiver is proximate to the base station.

The controller disclosed herein may be configured to determine a parameter indicative of a proximity of the receiver to the base station. Receiving the audio signal from the base station via the first wireless communication interface when the receiver is not proximate to the base station may comprise receiving the audio signal from the base station via the first wireless communication interface when the parameter indicates that the receiver is not proximate to the base station. Receiving the audio signal from the base station via the second wireless communication interface when the receiver is proximate to the base station may comprise receiving the audio signal from the base station via the second wireless communication interface when the parameter indicates that the receiver is proximate to the base station.

The first wireless communication interface may be DECT compliant. The second wireless communication interface may be Infrared Data Association, IrDA, compliant. The second wireless communication interface may receive audio signals in the Sony/Philips Digital Interface Format, S/PDIF.

The wired communication interface disclosed herein may comprise a quick-disconnect fitting.

Also disclosed herein is a base station suitable for transmitting an audio signal to a receiver, the base station comprising: a first wireless communication interface; a second wireless communication interface suitable for optical communication; and a controller configured to: determine a parameter indicative of a proximity of the receiver to the base station; transmit the audio signal to the receiver via the first wireless communication interface when the parameter indicates that the receiver is not proximate to the base station; transmit the audio signal to the receiver via the second wireless communication interface when the parameter indicates that the receiver is proximate to the base station.

A wireless receiver is disclosed comprising: a first wireless communication interface; a second wireless communication interface; a wired communication interface; and a controller, wherein the first wireless communication interface is a radiofrequency communication interface and the second wireless communication interface is an optical communication interface, and wherein the controller is configured to: receive an acoustic signal from a docking station via the first wireless communication interface when the wireless receiver is within a given proximity of the docking station; receive the acoustic signal from the docking station via the second wireless communication interface when the wireless receiver is not within a given proximity of the docking station; and transmit the acoustic signal via the wired communication interface.

An energy level of the energy store can be increased by electromagnetic energy transfer.

Also disclosed is a docking station comprising: a first wireless communication interface; a second wireless communication interface; and a controller, wherein the first wireless communication interface is a radiofrequency communication interface and the second wireless communication interface is an optical communication interface, and wherein the controller is configured to: transmit an acoustic signal to a wireless receiver via the first wireless communication interface when the wireless receiver is within a given proximity of the docking station; transmit the acoustic signal to a wireless receiver via the second wireless communication interface when the wireless receiver is not within a given proximity of the docking station.

BRIEF DESCRIPTION OF THE DRAWINGS

Examples of the present disclosure will now be explained with reference to the accompanying drawings in which.

Throughout the description and the drawings, like reference numerals refer to like parts.

DETAILED DESCRIPTION

The present disclosure relates to a headset system that is capable of switching communications to and from the headset between different communications channels having different communication ranges. In particular, a short-range communication channel is used where possible to relay an audio signal to the headset in order to minimise demand on a long-range communication channel.

Figure 1:
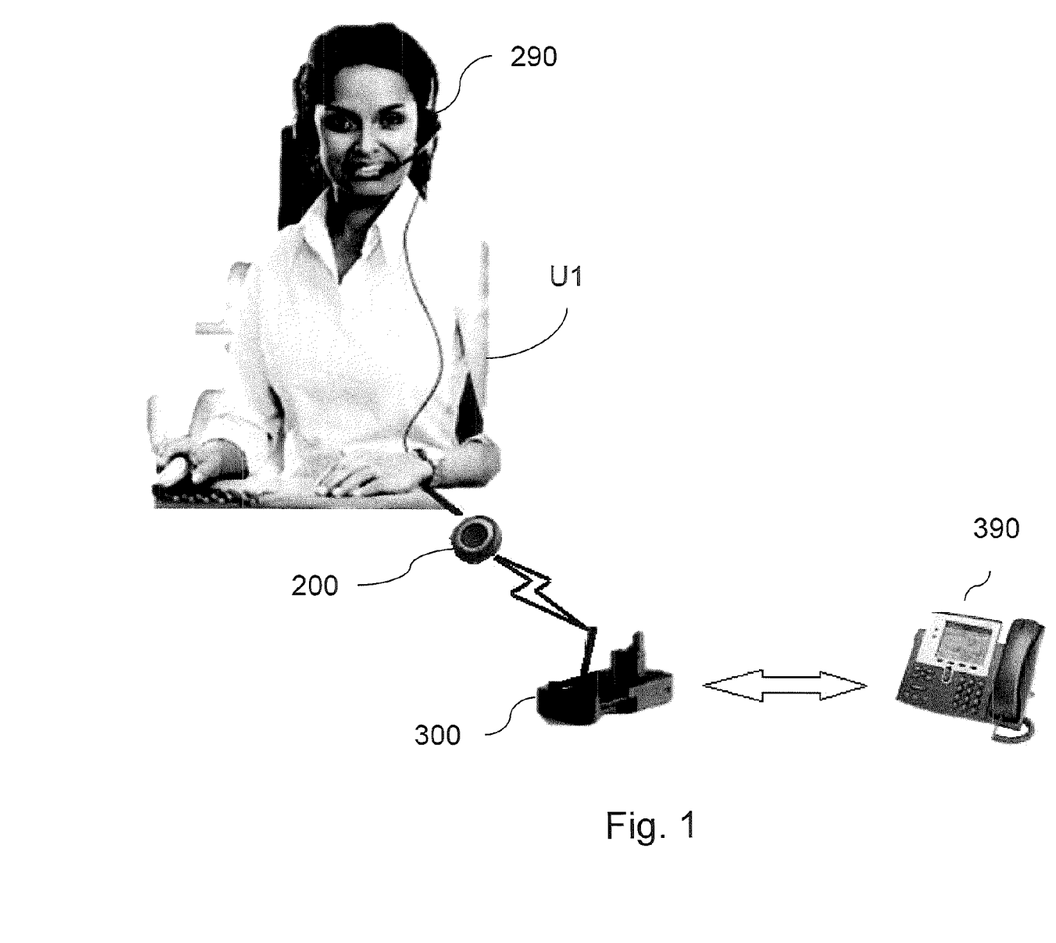
FIG. 1 is a diagram showing an application scenario for the methods and apparatuses described herein in which a headset is connected to a base station over a long-range wireless connection via a mobile device.
Figure 2:
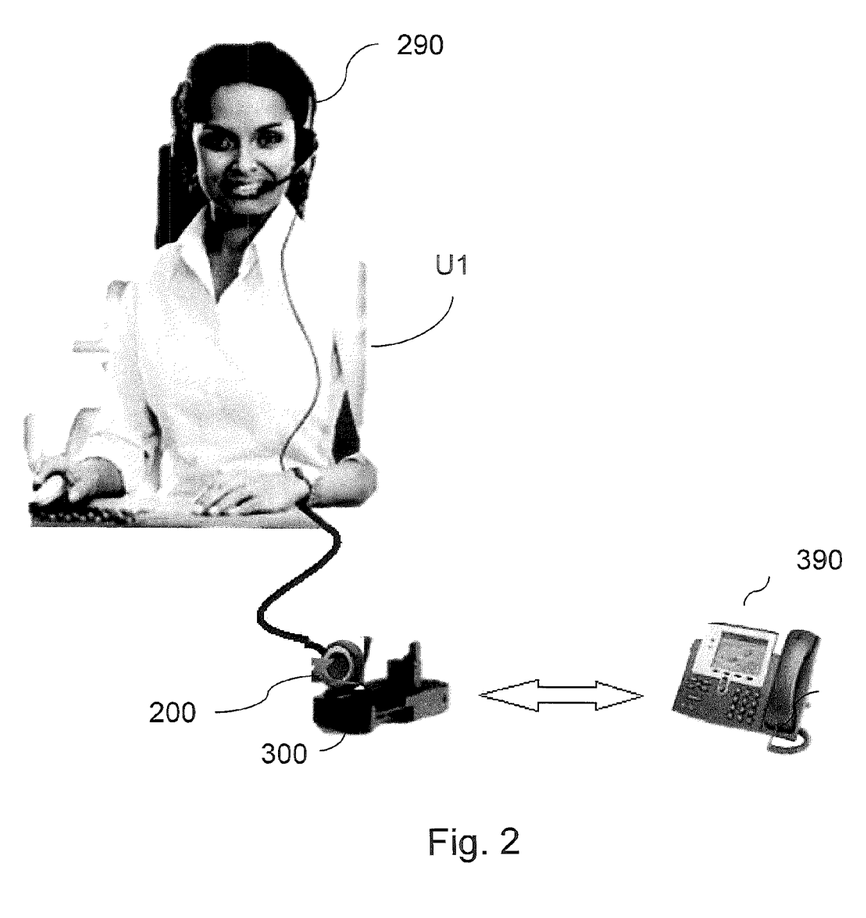
FIG. 2 is a diagram showing the application scenario of FIG. 1 with the headset connected to the base station over a short-range wireless connection via the mobile device.

In order to better understand the methods described herein, an exemplary application scenario of the headset system shall now be described with reference to FIGS. 1 and 2 with FIG. 1 illustrating the system working in a long-range communication mode and FIG. 2 illustrating the same system working in a short-range communication mode.

In FIG. 1, a user U1 is working in a call centre. A base station 300 is connected to a communications device, in this case a telephone 390. However, it will be appreciated that the audio source could be various other devices such as a computer. The base station 300 acts as a transceiver arranged to receive an audio signal from the telephone 390 and wirelessly transmit the audio signal to a mobile device 200. The mobile device 200 is in turn connected to a headset 290, worn by the user U1. The mobile device 200 therefore acts as a transceiver for the wireless headset 290. The mobile device 200 is therefore arranged to receive the audio signal from the base station 300 and then transmit the received audio to the headset 290 to be played through speakers in the headset 290 for the user to listen to the audio. Similarly, audio can pass from a microphone in the headset in the opposite direction towards the telephone.

In FIG. 1, the mobile device 200 may be attached to the user U1, for example by clipping onto the user's clothing. A wired connection is then provided between the mobile device 200 and headset 290. This wired connection may utilise a quick disconnect plug so that the headset can be easily disconnected.

In the arrangement shown in FIG. 1, there is sufficient distance between the user U1, and therefore the mobile device 200 which is attached to the user, and the base station 300. Consequently, a long-range wireless communication channel is used. In the arrangement of FIG. 1 this channel is a DECT channel. How the system determines that the distance is sufficient to use the long-range channel shall be discussed in detail with reference to FIG. 4.

FIG. 2 illustrates the same system as FIG. 1, except in this case the user U1 is sitting at a desk where the base station 300 is located. The user U1 is therefore able to dock the mobile device 200 with the base station 300 such that a short-range communication channel can be used between the mobile device 200 and the base station 300. The base station has a receiving portion in which the mobile device 200 can be docked. The receiving portion may be arranged to loosely receive the mobile device such that it is easy for the user U1 to place the mobile device 200 in the receiving portion without the need for connecting any wires or any plug-socket type arrangement. For example, the receiving portion of the base station 2 is preferably bowl shaped. This has the advantage of making it easy for the user U1 to place the mobile device 200 in the bowl shaped receiving portion of the base station 300. A consequence of this docking process is that a DECT channel is no longer used, which increases the DECT bandwidth available within the call centre. In the arrangement of FIG. 2, the audio signal is transmitted from the base station 300 to the mobile device 200 using infrared. Infrared has the advantage of providing a strong, secure short-range connection, and enables some tolerance between the position of the transmitter and receiver involved in the communication.

Figure 3:
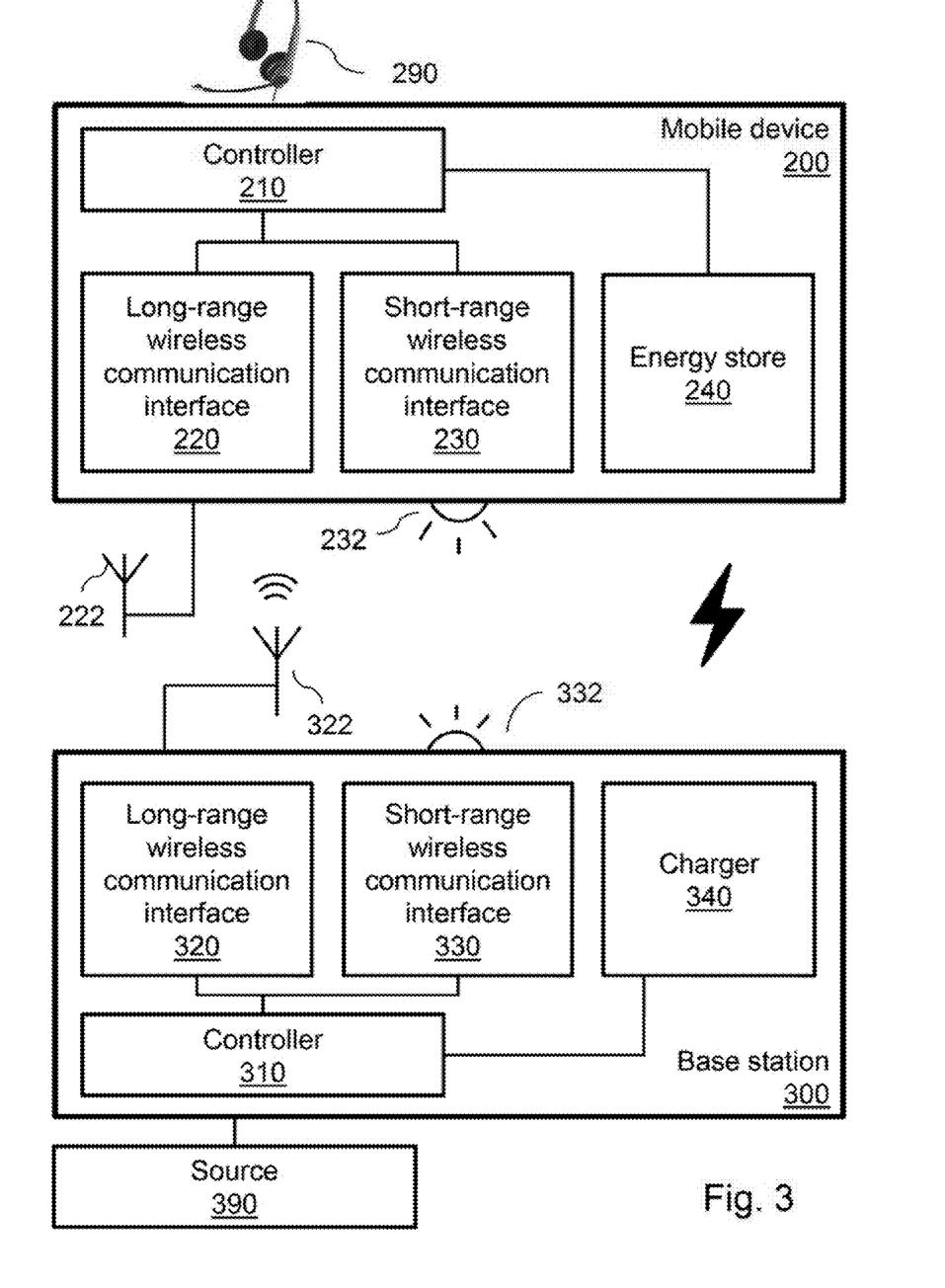
FIG. 3 illustrates the structure of the mobile device and the base station shown in FIGS. 1 and 2.

The components of the mobile device 200 and base station 300 shall now be discussed in detail with reference to FIG. 3.

The base station 300 is connected to the telephone 390 via a direct wired connection. This connection allows for two-way audio communications between the base station 300 and the telephone 390. The base station is then able to transmit and receive audio signals to the mobile device 200 via either a short-range wireless communication interface 330 or a long-range wireless communication interface 320. The long-range wireless communication interface 320 is a DECT interface, which transmits and receives signals using antenna 322. The short-range wireless communication interface 330 is an infrared interface, which transmits and receives signals using an infrared transceiver 332. The controller 310 switches from the long-range wireless communication interface 320 to the short-range wireless communication interface 330, and vice versa, according to the proximity of the mobile device 200 to the base station 300. The base station 300 includes a charger 340 for inductively charging the mobile device 200 when the mobile device 200 is sufficiently close to the base station 300 to enable inductive charging.

The mobile device 200 transmits and receives audio signals to and from the base station 300 via a corresponding short-range wireless communication interface 230 or a corresponding long-range wireless communication interface 220. The long-range wireless communication interface 220 is a DECT interface, which sends and receives the audio signal using antenna 222. The short-range wireless communication interface 230 is an infrared interface, which sends and receives the audio signal using an infrared transceiver 232. The controller 210 switches from the long-range wireless communication interface 220 to the short-range wireless communication interface 230, and vice versa, according to the proximity of the mobile device 200 to the base station 300. The mobile device 200 includes an energy store 240, which can be inductively charged by the charger 340 in the base station 300 when the mobile device 200 is sufficiently close to the base station 300 to enable inductive charging.

Figure 4:
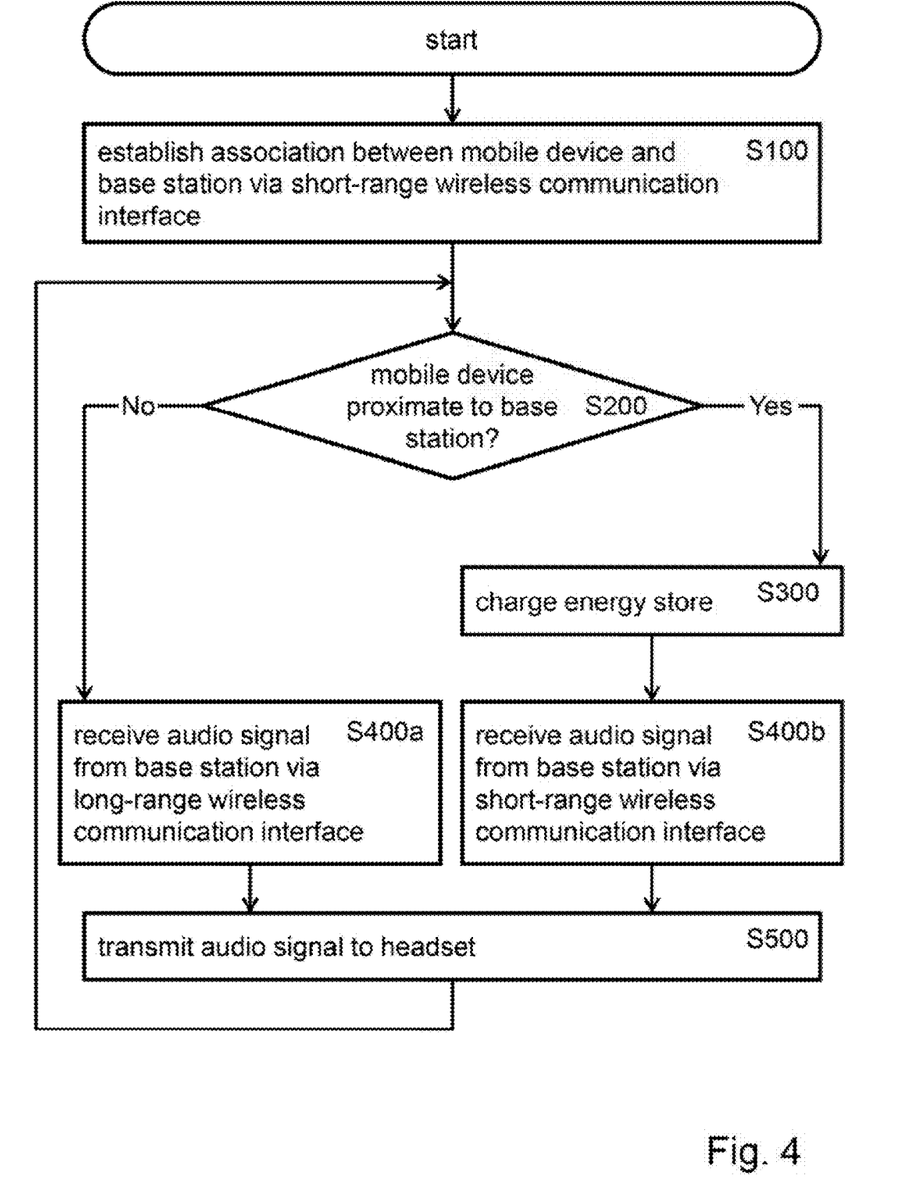
FIG. 4 is a flow diagram of the steps of a method described herein performed by the mobile device and base station shown in FIG. 3.

The way in which the mobile device 200 and base station 300 switch between the long-range and short-range modes of operation shall now be discussed in more detail with reference to FIG. 4. To simplify the explanation reference shall be made to audio being transmitted from the telephone 390 to the headset 290. However, it will be appreciated that the same principles apply for audio being transmitted from the headset to the telephone 390.

In a first step S100, an association is established between the mobile device 200 and the base station 300. In this arrangement the pairing is performed via signals sent between the mobile device 200 and base station 300 over the short-range wireless communication channel defined by the respective short-range wireless interfaces. This pairing step determines the mobile device 200 to which the base station 300 should send audio. The process is secure as the association is established via infrared signals, which are more difficult to intercept or transmit from outside the room in which the mobile device 200 and base station 300 are present. It will be appreciated that this first step could be performed by a manufacturer prior to shipping a product. As such, this step may not be required in some arrangements.

In step S200, the mobile device 200 or the base station 300 determines whether the mobile device 200 is proximate to the base station 300. This is done by determining a parameter indicative of the proximity of the mobile device 200 to the base station 300. This detection and switching process will be discussed in more detail.

If the mobile device 200 is proximate to the base station 300, in step S300 the charger 340 in the base station 300 inductively charges the energy store 240. The charger 340 only emits power for charging the energy store 240 once it receives a signal indicating that short-range communications are taking place. This helps to reduce unnecessary power wastage.

In step S400b, the mobile device 200 then receives the audio signal transmitted by the base station 300 via the short-range wireless communication interface 230. If the mobile device 200 is not proximate to the base station 300, in step S400a, the mobile device 200 instead receives the audio signal transmitted by the base station 300 via the long-range wireless communication interface 220.

In step S500, the mobile device 200 then transmits the audio signal to the headset 290.

The process of switching between the long-range and the short-range communications channels shall now be discussed in detail.

The base station 300 continuously monitors the proximity of the mobile device 200 to the base station 300. The base station controller 300 can therefore control the switching between the wireless communication interfaces as the proximity changes.

If the mobile device 200 is proximate to the base station 300 and communicating using short-range communication, then the base station 300 is continually monitoring the presence of the infrared signal from the mobile device 200. As soon as the infrared signal is determined to no longer be present, for example due to the mobile device 200 being removed from the receiving portion of the base station 300, the base station controller 310 will switch to sending the audio signal via the long-range wireless communication interface. The mobile device 200 is then able to detect that it has changed from short-range communications by virtue of the fact that it can now receive a long-range communication signal. As such, the mobile device controller 210 switches communications from the short-range communication interface 230 to the long-range communication interface 220. The controllers are able to perform this switching functionality seamlessly and without interruption.

If long-range communications are taking place, the switching occurs upon detection of the presence of the mobile device 200 in the receiving portion of the base station 300. In this case, the base station 300 continuously or periodically transmits an infrared signal, and waits for the signal to be detected by the mobile device 200. In practice the infrared signal will only be detected by the mobile device 200 when the mobile device 200 is within the receiving portion of the base station 300. When the mobile device 200 determines that it is proximate to the base station 300 it then transmits a signal back to the base station to inform the base station 300 that it is within range for short-range wireless communication. This signal is transmitted via infrared. The controllers of the base station 300 and mobile device 200 then switch communications channels to short-range communications.

An advantage of this switching process is that by ceasing to use the long-range wireless communication channel, the number of mobile devices 200 using the limited number of available DECT channels is reduced.

The system described herein is capable of achieving very high density deployments. In addition, it allows for an infinite number of headsets in the same office or call centre. It allows for improved sound quality due to freeing up bandwidth to enable use of wide band codecs. The system allows for additional security to be introduced by adding cross-technology exchange of link-keys. Another advantage of the system is that it provides increased flexibility for workers to work at or away from their desk. The embodiment of the system described above required no mechanical contacts, all contacts are wireless therefore making the system easy to use and simplifies the process of switching between long-range and short-range communications.

Although a detailed example of at least one aspect of the present invention is described above, certain modifications to the above example would be obvious to a person of ordinary skill in the art. As such, the scope of the invention is limited only by the accompanying claims.

Although the above description focuses on the mobile device 200 receiving an audio signal from a base station 300, if the headset 290 connected to the mobile device 200 has a microphone, the mobile device 200 will also transmit an audio signal to the base station 300, and will switch from transmitting the audio signal via the long-range wireless communication interface 220 to transmitting the audio signal via the short-range wireless communication interface 230, and vice versa, according to the proximity of the mobile device 200 to the base station 300. In alternative arrangements, the system will only be capable of one-way communication. For example, in one arrangement the system is used to transmit audio from a source to a headphone. In such an arrangement, the system can be used for music streaming.

It will be appreciated that the long-range communications enable communications with a greater distance between the mobile device 200 and base station 300 compared to short-range communications.

Although in the present disclosure the short-range wireless communication interfaces 230 and 330 are infrared interfaces, it will be appreciated that these interfaces could use other wireless technologies. For example, these interfaces could be optical interfaces using other wavelengths. Alternatively, the interfaces could be inductive communication interfaces. For example, an audio signal could be modulated onto the inductive charging signal. In other arrangements, the short-range wireless communication interfaces 230 and 330 could even be replaced with conductive communication interfaces such as conductive connectors.

Similarly, the long-range communication interfaces 220 and 320 could use radiofrequency signals at other frequencies, or use other wireless transmission protocols (e.g. WiFi®, Bluetooth®, etc.).

Instead of being charged by the base station 300, the energy store 240 may be charged by any charger (whether inductive or wired); in this case, the energy store 240 could be charged whether the mobile device 200 is proximate to the base station 300 or not.

While the above description discusses the switching process taking place in response to the presence or absence of the short-range wireless signal, it will be appreciated that the switching may be triggered by various other means. In one alternative arrangement, a determination as to the proximity of the mobile device 200 to the base station 300 is carried out based on a strength of a signal transmitted from the long-range wireless communications interface 220 of the mobile device and received at the long-range wireless communication interface 320 of the base station 300. In particular, in such an arrangement the base station 300 is able to approximate the distance of the mobile device 200 from the base station 300 based on the signal strength being received at the base station 300 from the mobile device 200 when the system is operating using long-range wireless communication. A threshold is set to indicate that the mobile device 200 is sufficiently close to enable short-range communications. This process is preferable in arrangements where the short-range communications are not infrared, but have a slightly larger range.

In other arrangements separate sensing is provided to initiate the switching between long-range and short-range communications.

It will be appreciated that the turning on and off of the charging functionality may work independently of the switching between long and short range communication channels.

While the mobile device and headset are shown as separate devices, it will be appreciated that in certain arrangements these devices may be integrated. For example, a mobile device may be provided with the functionality of the headset or a headset may be provided with the functionality of the mobile device.

It will also be appreciated that while the base station and telephone are described as separate components, their functionality may be combined. In fact, the functionality of the base station may be incorporated within any communications interface device such as a telephone, computer or such like.

In other arrangements, further communications channels could be provided such that there are more than two communications channels. For example, cellular communications could be added as a third range of communications which is used when the mobile device is too far from the base station for the long-range wireless communications channel to work satisfactorily.

The approaches described herein may be embodied on a computer-readable medium, which may be a non-transitory computer-readable medium. The computer-readable medium may carry computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

The invention claimed is:

1. A system for reducing a risk of a communication system exceeding a number of available communication channels for communicating an audio signal from a source between a base station and a mobile device communicating with that base station in a space with potentially more users than the number of channels will support with geographical separation for the number of channels, the system comprising:
  a. an audio signal;
  b. a base station for receiving the audio signal;
  c. a long range communication link between the base station and the mobile device and having a known finite number of channels available in said space;
  d. a short range audio communications link between the base station and the mobile device and;
  e. the mobile device comprising:
  a first wireless communication interface operable to communicate using a first long range mode of wireless communication;
  a second wireless communication interface operable to communicate using a second short range mode of wireless communication, the second mode having a shorter range than the first mode; and
  a controller (210) configured with a predetermined threshold level to determine if the mobile device is within a distance to support connection to the base station by said second communications mode to switch from receiving the audio signal from the base station via the first wireless communication interface to receiving the audio signal via the second wireless communication interface when the mobile device is within the distance to the base station, terminating the first mode of wireless communication and releasing channels associated therewith for use by other users;
  wherein the short range communications link is an optical communication interface or an inductive communication interface.

2. The mobile device of claim 1 further comprising an energy store operable to be charged via electromagnetic energy transfer and wherein said threshold is presence of electromagnetic energy in said mobile device detected above a predetermined level.

3. The mobile device of claim 2, wherein the energy store is operable to be charged via electromagnetic energy transfer from the base station.

4. The mobile device of claim 3, wherein the mobile device is configured to charge the energy store when the mobile device is within the distance to the base station.

5. The mobile device of claim 1, the controller being further configured to switch from receiving the audio signal from the base station via the second wireless communication interface to receiving the audio signal via the first wireless communication interface when the mobile device is not within the distance to the base station.

6. The mobile device of claim 1, the controller being further configured to determine a parameter indicative of a proximity of the mobile device to the base station, and wherein the switching is based on the parameter.

7. The mobile device of claim 6, wherein the parameter is a presence of a signal of the second mode of wireless communication at the second wireless communication interface above a threshold level.

8. The mobile device of claim 6, wherein the parameter is a presence of electromagnetic energy above a threshold level.

9. The mobile device of claim 1, the controller being further configured to establish an association between the mobile device and the base station via the second wireless communication interface.

10. The mobile device of claim 1, wherein the first wireless communication interface is a radiofrequency communication interface.

11. The mobile device of claim 1, wherein the second wireless communication interface is an infrared interface.

12. A system for reducing a risk of a communication system exceeding a number of available communication channels for communicating an audio signal from a source between a base station and a mobile device communicating with the base station and in a space with potentially more users than the number of channels will support with geographical separation for the number of channels, comprising:
  a. an audio signal;
  b. a base station for receiving the audio signal;
  c. a mobile device for receiving the audio signal from said base station;
  d. a long range communication link between the base station and the mobile device and having a known finite number of channels available in said space;
  e. a short range audio communications link between the base station and the mobile device;
  f. the base station comprising;
  a first wireless communication interface operable to communicate using a first mode of wireless communication;

a second wireless communication interface operable to communicate using a second mode of wireless communication, the second mode having a shorter range than the first mode;

and electromagnetic transmitter in said base station;

an electromagnetic receiver in said mobile device for inductively charging said mobile device and for measuring a strength of electromagnetic force from said base station; and a controller configured to switch from transmitting the audio signal to the mobile device via the first wireless communication interface to transmitting the audio signal to the mobile device via the second wireless communication interface when the mobile device detects an electromagnetic force strength is above a predetermined level when the mobile device is within a distance of the base station; and terminating the long range communication link and releasing channels associated therewith for use by other users;

wherein the short range communications link is an optical communication interface or an inductive communication interface.

13. The base station of claim 12 further comprising a charger operable to charge an energy store of the mobile device via electromagnetic energy transfer.

14. A method for reducing a risk of a communication system exceeding a number of available communication channels for communicating an audio signal from a source between a base station and a mobile device in space with potentially more users than the number of channels will support with geographical separation for the number of channels comprising:

configuring a first wireless communication interface with a known finite number of channels to be operable to communicate using a first long range mode of wireless communication between the base station and the mobile device;

configuring a second wireless communication interface to be operable to communicate using a second short range mode of wireless communication between the base station and the mobile device, the second mode having a shorter range than the first mode; and configuring a controller with a predetermined threshold level to determine if the mobile device is within a distance to support connection to the base station by said second mode of wireless communication to switch from receiving the audio signal from the base station via the first wireless communication interface to receiving the audio signal via the second wireless communication interface when the mobile device is within the distance to the base station;

terminating the first mode of wireless communication and releasing channels associated therewith for use by other users;

configuring the controller to switch from receiving the audio signal between the base station via the second wireless communication interface to receiving the audio signal via the first wireless communication interface when the mobile device is not within the distance to the base station.

15. The method of claim 14, wherein the second interface uses inductive energy transmitted from the base station.

16. The method of claim 14 further including a step of transmitting inductive energy to the mobile device when within the distance to the base station.

* * * * *